(12) United States Patent
Ekberg et al.

(10) Patent No.: US 10,474,844 B2
(45) Date of Patent: Nov. 12, 2019

(54) CRYPTOGRAPHIC PROGRAM DIVERSIFICATION

(71) Applicant: TRUSTONIC LIMITED, Cambridge (GB)

(72) Inventors: Jan-Erik Gustav Ekberg, Helsinki (FI); Donald Kenneth Felton, Cambridge (GB)

(73) Assignee: Trustonic Limited, Cambridge (GB)

( * ) Notice: Subject to any disclaimer, the term of this patent is extended or adjusted under 35 U.S.C. 154(b) by 177 days.

(21) Appl. No.: 15/259,315

(22) Filed: Sep. 8, 2016

(65) Prior Publication Data

US 2017/0116438 A1 Apr. 27, 2017

(30) Foreign Application Priority Data

Oct. 27, 2015 (GB) .................................. 1518965.7

(51) Int. Cl.
*G06F 21/00* (2013.01)
*H04L 29/06* (2006.01)
(Continued)

(52) U.S. Cl.
CPC .............. *G06F 21/71* (2013.01); *G06F 21/14* (2013.01); *G06F 21/53* (2013.01); *G06F 21/606* (2013.01);
(Continued)

(58) Field of Classification Search
CPC .......... G06F 21/71; G06F 21/53; G06F 21/14; G06F 2221/2149; G06F 2221/033
See application file for complete search history.

(56) References Cited

U.S. PATENT DOCUMENTS

2009/0119759 A1 5/2009 Taugbol
2009/0150674 A1 6/2009 Richardson et al.
(Continued)

FOREIGN PATENT DOCUMENTS

GB 2 434 724 8/2007
GB 2468890 A * 9/2010 ............. G06F 21/34

OTHER PUBLICATIONS

Suman Jana, Sneha Kumar Kasera; "On fast and accurate detection of unauthorized wireless access points using clock skews"; Sep. 2008; MobiCom '08: Proceedings of the 14th ACM international conference on Mobile computing and networking; Publisher: ACM; pp. 104-115 (Year: 2008).*

(Continued)

*Primary Examiner* — Kambiz Zand
*Assistant Examiner* — Courtney D Fields
(74) *Attorney, Agent, or Firm* — Nixon & Vanderhye P.C.

(57) ABSTRACT

A device has an installed cryptographic program that performs cryptographic operations in dependence upon a received diversification value. The diversification value is generated by an obfuscated personalisation program installed in the device and is dependent upon a personalisation input to the personalisation program. The personalisation input is characteristic of the particular execution environment provided by the device, and may take the form of a proper subset selected from among variables characterising the device, such as hardware properties, static software configuration and results from processing dynamic variables to check that they have expected properties. The diversification value generated by the personalisation program is returned (in encrypted form) to a server which also has a copy of the cryptographic program. Thus, the server and the device may communicate using a secure channel provided by the combination of the cryptographic program and the diversification value. The personalisation program installed may be obfuscated by code flattening, reordering and variable fragmentation.

23 Claims, 6 Drawing Sheets

(51) Int. Cl.
*H04L 9/32* (2006.01)
*H04W 12/06* (2009.01)
*G06F 21/71* (2013.01)
*G06F 21/60* (2013.01)
*G06F 21/14* (2013.01)
*G06F 21/53* (2013.01)

(52) U.S. Cl.
CPC ...... *H04L 63/0435* (2013.01); *H04L 63/0876* (2013.01); *G06F 2221/033* (2013.01); *G06F 2221/0704* (2013.01); *G06F 2221/2149* (2013.01)

(56) References Cited

U.S. PATENT DOCUMENTS

2012/0079282 A1* 3/2012 Lowenstein ............ G06F 21/82
713/189
2012/0201381 A1 8/2012 Miller et al.

OTHER PUBLICATIONS

Combined Search and Examination Report for GB1518965.7 dated May 16, 2016, 7 pages.
Extended European Search Report dated Feb. 9, 2017 in EP Application No. 16187055.5, 7 pages.

* cited by examiner

CRYPTOGRAPHIC PROGRAM DIVERSIFICATION

This claims priority to GB Patent Application No. 1518965.7 filed Oct. 27, 2015, the entire content of which is hereby incorporated by reference.

BACKGROUND

Technical Field

This disclosure relates to the field of data processing systems. More particularly, this disclosure relates to data processing systems utilising a cryptographic program to perform one or more cryptographic operations.

Technical Background

It is known to provide data processing systems with cryptographic programs to perform one or more cryptographic operations, such as encrypting data, decrypting data, and manipulating cryptographic keys. Considerable resources may be devoted to generating cryptographic programs which are resistant to malicious alteration and/or reverse engineering analysis. One form of attack upon the integrity of the system may be to copy a cryptographic program deployed to one device to another device such that it may be inappropriately used to perform cryptographic operations in that other device. Accordingly, it may be desirable to form a cryptographic program such that it is bound to operate upon an individual device and will not operate if copied to another device. However, the time and resources needed to generate a suitably obfuscated cryptographic program which is resistant to misuse and reverse engineering and is tied to an individual device is disadvantageous in terms of resource, time and expense consumed.

SUMMARY

At least some embodiments of the disclosure provide a method of operating a data processing apparatus comprising:

receiving a personalisation program at said data processing apparatus;

executing said personalisation program to read as a personalisation input values of a plurality of variables characterising said data processing apparatus and to generate a diversification value as a function of said personalisation input;

supplying said diversification value as a diversification input to a cryptographic program; and executing said cryptographic program to perform a cryptographic operation in dependence upon said diversification value.

The present disclosure provides a technique for tying a cryptographic program to an individual device in a manner that is resistant to malicious interference. In particular, a personalisation program is provided to the device and serves to generate a diversification input in dependence upon a plurality of variables characterising the individual device and read from the individual device. The cryptographic program then performs cryptographic operations that are dependent upon the received diversification value. The technique recognises that the individual devices in which it may be desired to use the cryptographic program will show significant variation in suitably selected variables characterising those devices such that the personalisation program will receive a different personalisation input for those devices and differing diversification values can be generated by the personalisation program and supplied to the cryptographic program so as to alter the cryptographic operations it performs. Thus, a cryptographic program copied from one device instance to another device instance will receive a different diversification value in those different instances and accordingly perform different cryptographic operations, such that if it is desired to perform the same cryptographic operation in a different device, then it will not be possible to simply copy the cryptographic program to that different device as the cryptographic operations performed will depend upon the different diversification value which would be generated by the personalisation program in that different device. Thus, a cryptographic program and its associated cryptographic operations are securely tied to an individual device without the needs to provide an individual cryptographic program for each device.

It will be appreciated that the plurality of variables which characterise the individual data processing apparatus (device) may take a variety of different forms. A convenient form of variable which may be readily accessed by the personalisation program are those which characterise the configuration of an execution environment of the data processing apparatus. For example, these variables may include one or more of hardware properties of the data processing apparatus (e.g. IMEI value, memory size, serial number, MAC address), and/or static software configuration variables (e.g. entries within an /etc directory, Windows registry entries and the like).

Another example of a characteristic variable of a data processing apparatus which may form part of a personalisation input is a result value determined by applying a processing operation to a dynamic variable of the data processing apparatus with the data specifying the processing operation to be applied being stored in secure storage such that it may be kept secret. Certain dynamic variables associated with a device may have properties which are predictable, such as the charging cycle count of a battery of a device only normally increasing. Thus, a personalisation input to the personalisation program may be a flag indicating that the dynamic variable corresponding to the charging cycle count of a battery has remained the same or increased in the expected manner. If a cryptographic program and the securely stored processing operation applied to the dynamic variable are copied to another device, then the different value of the dynamic variable on that other device may likely produce a different result from the processing operation and accordingly lead to a different personalisation input to the personalisation program. In some embodiments, the data specifying the data processing operation to be applied to the dynamic variable may itself be embedded within a cryptographic program which is diversified with its own diversification value dependent upon static variables of the data processing device concerned.

Security of the system is improved when the personalisation program is executed in an isolated execution environment such that the algorithm combining personalisation values into input for the cryptographic operation can be executed in secret. This isolated execution environment to provide such secrecy can take a variety of different forms. In some embodiments, the hardware may provide a trusted execution environment in which the personalisation program may be executed (e.g. the secure domain of processors provided with the TrustZone architecture of ARM processors). Other forms of isolated execution environments may be such as requiring a physical key (e.g. USB dongle) to permit the personalisation program to execute to generate the diversification value. A further form of isolated execution environment for the personalisation program may be provided by obfuscation of the personalisation program whereby the deployed/installed personalisation program is formed by subjecting a source program (e.g. a source code version of the personalisation program) to a code obfuscation process (e.g. code flattening, code reordering, variable fragmentation etc.).

The diversification value controls (at least partially) the cryptographic operations performed by the cryptographic program of an individual data processing apparatus (device). In order that a server may appropriate interact with the cryptographic program on an individual device, some embodiments may transmit data specifying the diversification value to that server. The server may then encrypt protected data in dependence upon the diversification value it has received, and using the same cryptographic program supplied to the device, and send this to the data processing apparatus (device) concerned. The encryption of the protected data in dependence upon the same diversification value being used by the cryptographic program at the target data processing apparatus (target device) has the effect that the cryptographic operation performed at the target data processing apparatus to decrypt the encrypted protected data may be performed correctly and recover the protected data. However, another device using a different diversification value for the same cryptographic program, if it were to receive the encrypted protected data, would not be able to decrypt that encrypted protected data as its cryptographic program would perform a different cryptographic operation as it would be supplied with a different diversification value.

When data specifying the diversification value used by a device is returned to a server, then this may be done in a variety of different ways. In some example embodiments, the diversification value may be communicated as an encrypted form of the diversification value. Another possibility is to communication the diversification value by transmitting an encrypted form (e.g. using public/private key encryption) of the personalisation input which generated that diversification value such that the receiving server can use the personalisation program which it sent to the data processing apparatus (device) concerned to itself to generate the same diversification value from the personalisation input that has been sent to it (in encrypted form). Further security may be added to the system by providing that the personalisation program include at least one embedded variable and that a diversification value generated by the personalisation program is a function of this embedded variable. Thus, different instances of the personalisation program may be generated with different embedded variables such that they generate a different diversification value from the same personalisation input. This makes it more difficult to discover the relationship between the personalisation input and the diversification value produced by the personalisation program. The cryptographic program may be the same over many instances of a device in which it is used (e.g. the same binary program downloaded from an application store), but the personalisation program applies local diversification to enable device specific cryptographic operation where desired.

The present techniques have a particular utility in the field of wireless mobile devices which may wirelessly download the personalisation program as part of the initialisation/installation of a system including use of a cryptographic program. However, the present techniques may also be used outside of the field of wireless mobile devices.

At least some further embodiments of the disclosure provide a data processing apparatus comprising program controlled processing circuitry configured to perform the steps of:

receiving a personalisation program at said data processing apparatus;

executing said personalisation program to read as a personalisation input values of a plurality of variables characterising said data processing apparatus and to generate a diversification value as a function of said personalisation input;

supplying said diversification value as a diversification input to a cryptographic program; and executing said cryptographic program to perform a cryptographic operation in dependence upon said diversification value.

At least some embodiments of the present disclosure provide a method of configuring a data processing apparatus comprising:

selecting a proper subset from among a set of variables of said data processing apparatus, values of said proper subset serving as values of a plurality of variables characterising said data processing apparatus;

generating a personalisation program to control said data processing apparatus to read as a personalisation input said values of said plurality of variables characterising said data processing apparatus and to generate a diversification value for a cryptographic program as a function of said personalisation input; and transmitting said personalisation program to said data processing apparatus.

As well as the previously described behaviour at the data processing apparatus (device) which uses the cryptographic program, the present techniques also display a complementary aspect in the behaviour of a system(s) which configures and communicate with the data processing apparatus (device), e.g. the server which supplies the personalisation program to the data processing apparatus. In particular, the personalisation programs supplied to different data processing apparatus may be varied by selecting a proper subset from among a set of variables of the data processing apparatus, with values of that proper subset then serving as values of the plurality of variables characterising the data processing apparatus which are to be used by the personalisation program being generated. Thus, the personalisation program generated with the particular selected proper subset of characterising variables will be transmitted to the target data processing apparatus and then used to generate an appropriate diversification value at that target data processing apparatus. The variation in the proper subset selection for respective personalisation programs generated helps resist an attacker gaining an understanding of the operation of the personalisation programs such that they may seek to circumvent the additional security provided by their use.

As previously discussed, the server which provided the personalisation program (or another server suitably associated with the providing server) may receive data specifying the diversification value from the data processing apparatus in which the personalisation program has been installed and then use that diversification value to form encrypted protected data to be transmitted securely to that data processing apparatus such that it may be decrypted at the intended recipient data processing apparatus using the same diversification value as an input to local device-installed cryptographic program.

In some embodiments, as well as transmitting the personalisation program to the target data processing apparatus, the cryptographic program itself may also be transmitted to the target data processing apparatus. In other embodiments, the cryptographic program may be separately downloaded/installed via a different channel and then authorised/configured for use by the downloading of an appropriate personalisation program.

At least some embodiments of the disclosure also provide a data processing apparatus comprising program controlled processing circuitry configured to perform the steps of:

selecting a proper subset from among a set of variables of said data processing apparatus, values of said proper subset serving as values of a plurality of variables characterising said data processing apparatus;

generating a personalisation program to control said data processing apparatus to read as a personalisation input said plurality of variables characterising said data processing apparatus and to generate a diversification value for a cryptographic program as a function of said personalisation input; and transmitting said personalisation program to said data processing apparatus.

Further aspects, features and advantages of the present technique will be apparent from the following description of examples, which is to be read in conjunction with the accompanying drawings.

DESCRIPTION OF EXAMPLES

Figure 1:
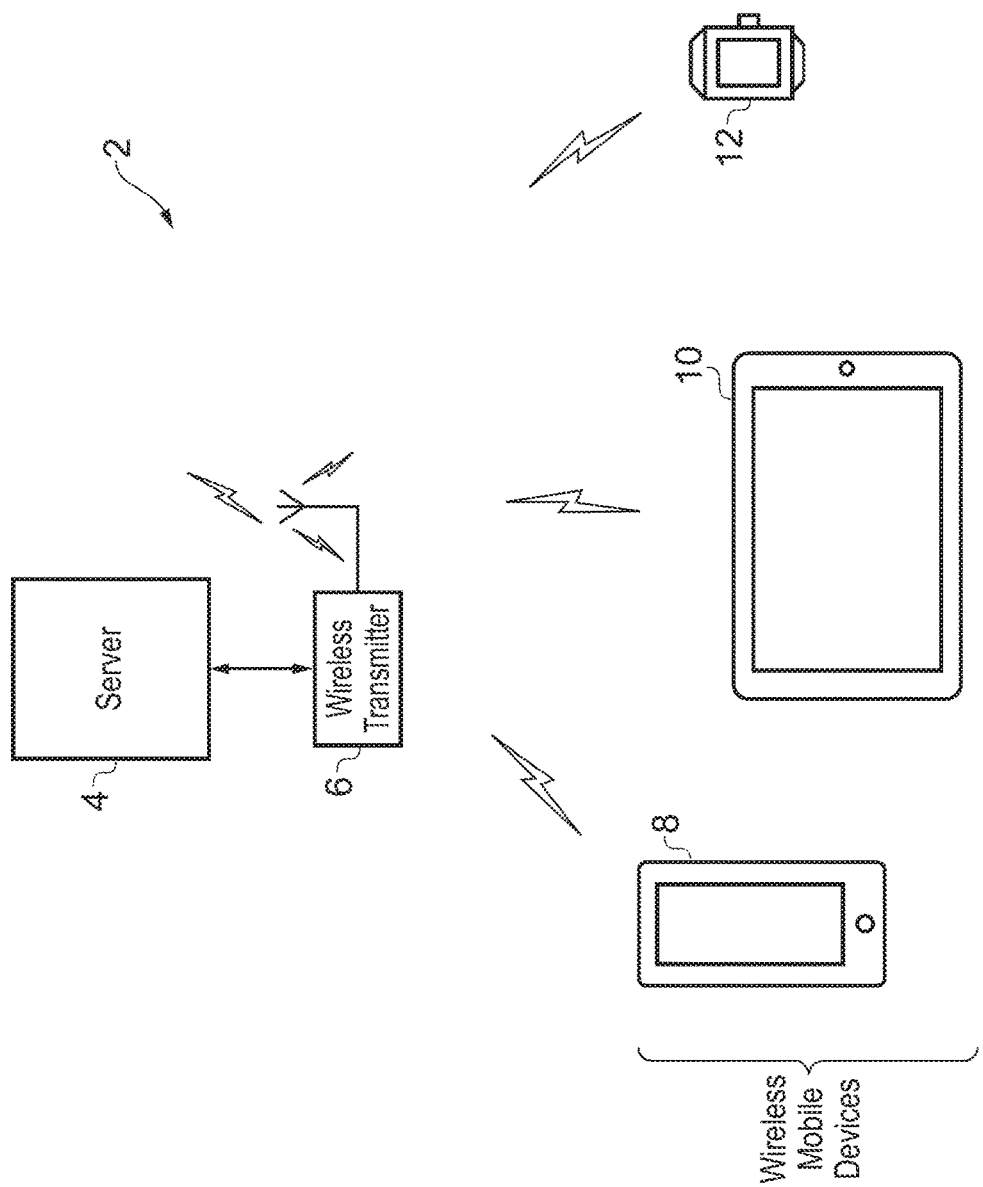
FIG. 1 schematically illustrates a server wirelessly communicating with a plurality of mobile devices.

FIG. 1 schematically illustrates a data processing system 2 including a server 4 linked via a wireless transmitter 6 to a plurality of wireless mobile devices 8, 10, 12. The wireless mobile devices 8, 10, 12 may, for example, take the form of a smartphone 8, a tablet computer 10 and a smartwatch 12. It will also be appreciated that the disclosed techniques may also be applied to devices other than wireless mobile devices, e.g. personal computers, internet-of-things (IoT) device, etc.

A cryptographic program may be desired to be used in the wireless mobile devices 8, 10, 12. For example, a secure application interacting with a bank account may be used by the wireless mobile devices. Such a secure application may include a cryptographic program for performing cryptographic operations, such as encryption, decryption and cryptographic key manipulation. The cryptographic program may be produced/generated at considerable effort to have unique form for the secure application concerned and be obfuscated to a degree that makes reverse engineering of the behaviour of the cryptographic program difficult and extraction of any cryptographic keys, or other secret information (e.g. the behaviour of cryptographic algorithms), difficult to perform. However, one form of misuse of the cryptographic program would be to copy an instance of the cryptographic program from one of the wireless mobile devices, such as the smartphone 8, onto another of the wireless devices, such as the tablet computer 10, and then attempt to execute that cryptographic program to perform unauthorised cryptographic operations, such as decrypting protected data. The present techniques serve to tie a cryptographic program to a mobile device 8, 10, 12 through use of a personalisation program responsive to a personalisation input to generate a diversification value which is supplied to the cryptographic program and in dependence upon which the cryptographic program performs its cryptographic operations.

Figure 2:
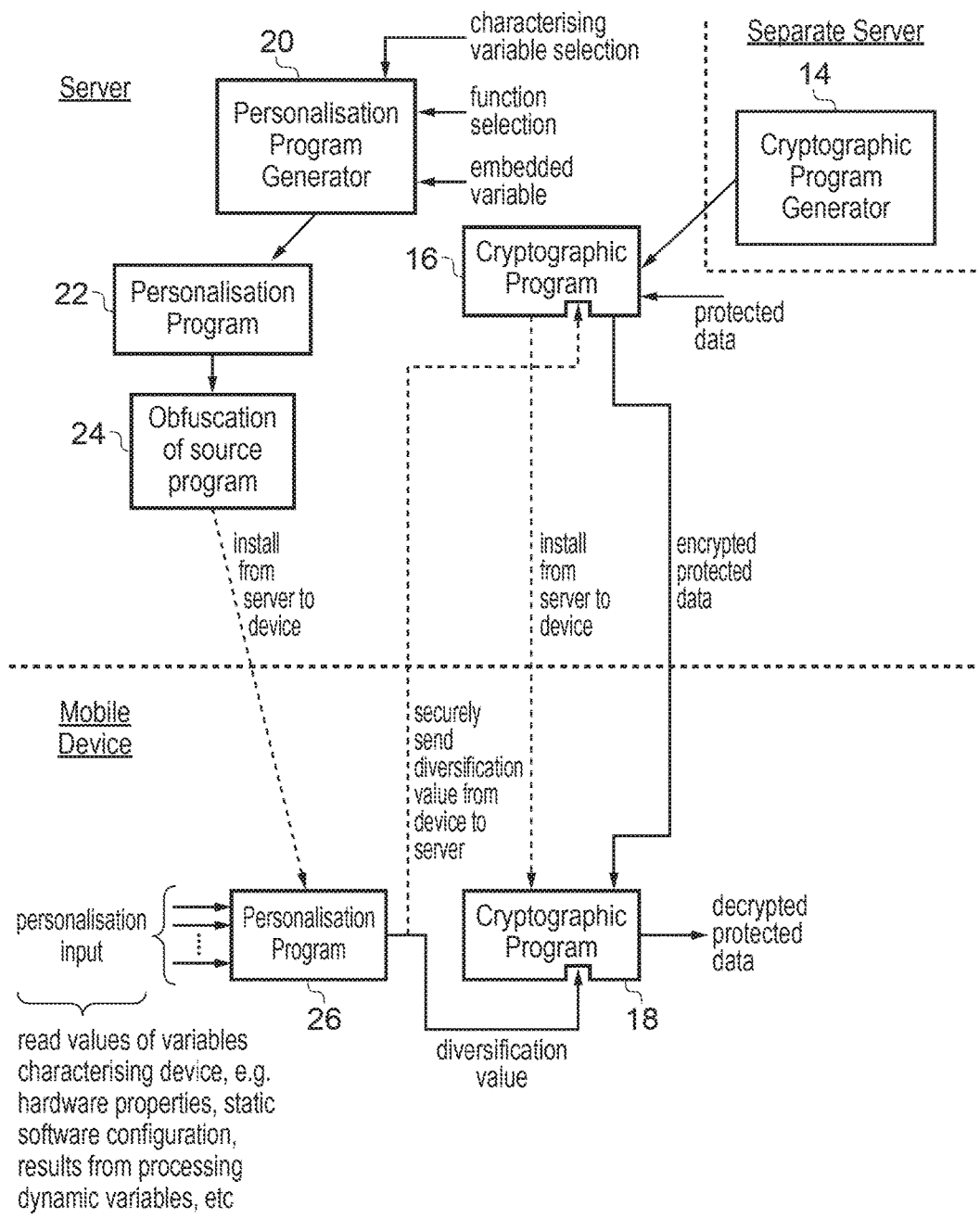
FIG. 2 schematically illustrates the provision of a personalisation program and a cryptographic program to a mobile device and the use of a personalisation program at the mobile device to generate a diversification value in dependence upon which the cryptographic program performs cryptographic operations.

FIG. 2 schematically illustrates one example of the use of the present techniques. A cryptographic program generator 14 generates a cryptographic program 16 which it is intended to distribute to a plurality of mobile devices 8, 10, 12. The cryptographic program 16 may take the form of a "keybox" program which contains, in obfuscated and secure form, both secret cryptographic algorithms and secret cryptographic keys. If the cryptographic program 16 is copied from one device to another device, then the cryptographic algorithms and the cryptographic keys are also copied between those devices, but the users of both devices are unable to examine the details of those cryptographic keys or the cryptographic algorithms, rather they are provided with the ability in invoke cryptographic functions provided by the cryptographic program 16.

In the case of an individual mobile device, when it is desired to add a secure processing application to that mobile device, a copy of the cryptographic program 16 is installed from a server holding that cryptographic program 16 into the mobile device to form an installed cryptographic program 18 at the mobile device. At the same time, or possibly at a different time, the server, or possibly a different server, uses a personalisation program generator 20 responsive to inputs specifying characteristic variable selection, function selection and an embedded variable(s) to generate an instance of a personalisation program 22 which is to be installed to the mobile device for use with the installed cryptographic program 18. The personalisation program generator 20 uses the characteristic variable selection input to select a proper subset from among a superset of potential characteristic variables of a device. The selected proper subset are used by the instance of the personalisation program 22 to be generated as a personalisation input to that personalisation program 22. Similarly, the function selection input to the personalisation program generator 20 serves to select from among a plurality of possible functions that can be applied to the personalisation input by the personalisation program 22 a particular function that will be applied by the personalisation program 22 to be generated. It will be appreciated that the function selection may select different combinations of logical operators, operand ordering, and the like, using which the different selected characteristic values forming the personalisation input may be logically combined to generate a diversification value which will be supplied to the installed cryptographic program 18. The personalisation program generator 20 may also receive one or more embedded variables to be embedded within the personalisation program 22 and upon which the generation of the diversification value from the personalisation input is dependent. Such an embedded variable(s) may be one or more literal variables embedded within the personalisation program 22.

The personalisation program 22 may be generated as a source program (e.g. in source code form) by the personalisation program generator 20 and then subject to an obfuscation step 24 at which step the personalisation program is obfuscated, e.g. by code flattening, code reordering, variable fragmentation and other techniques, in order to form an obfuscated personalisation program that is resistant to reverse engineering such that the mapping between a personalisation input and the associated diversification value generated is more difficult to understand.

The obfuscated personalisation program generated at step 24 is installed to provide an installed personalisation program 26 in the mobile device. Upon installation, or upon each time that the secure application is to be used, the installed personalisation program 26 serves to read values of variables characterising the device as a personalisation input to the installed personalisation program 26. These variables characterising the device can take a wide variety of different forms, such as hardware properties, static software configuration properties, results from performing secret processing operations upon dynamic variables to check that they have an expected behaviour, etc. Installed personalisation program 26 performs the selected processing function upon the personalisation input, and any embedded variables, as specified by the function selected when the personalisation program generator 20 generated the personalisation program 22, in order to generate a diversification value.

The diversification value is securely sent back to the server that supplied the installed obfuscation program 18. The cryptographic program 18 performs its cryptographic operations in dependence upon the diversification value supplied to it. The personalisation input will have a different value for different mobile devices. The personalisation input may characterise the execution environment provided by the device. These typically differ between instances of those devices, such as installed memory size, IMEI value, MAC address, processor type, cache memory size, etc. Furthermore, the static software configuration of the individual devices will also vary, such as firmware version, register values, /etc directory entries etc. Thus, the installed personalisation program 26 "sniffs" the device upon which it is installed to read characteristic variables of that device to serve as a "fingerprint" of that device in order to generate a diversification value which will vary between different devices even if the same personalisation program 26 is executed in those different devices. Thus, an installed cryptographic program 18 and its associated diversification value are tied to an individual instance of a mobile device (or at least those instances which will produce the same personalisation input—it is rare that two devices will generate the same personalisation input). Furthermore, the obfuscated nature of the installed personalisation program 26 renders it difficult for an attacker to understand how a personalisation program may be modified to generate a desired diversification from a different set of personalisation inputs when the personalisation program is installed upon a different device.

The diversification value which is returned to the server in encrypted form is decrypted and stored in the server so that it may substantially be used as an input to a corresponding instance of the cryptographic program 16 at the server to perform cryptographic operations to send protected data to the mobile device having the install cryptographic program 18 and using that same diversification value. Thus, a secure communication channel is provided between a server and a device when the server and the device both use the same cryptographic program 16, 18 and the same diversification value upon which the cryptographic operations performed by that cryptographic program 16, 18 depend.

As mentioned above, the personalisation input to the installed personalisation program 26 may include a result value from processing a dynamic variable of the device. This result may be derived from performing a secret processing operation upon a dynamic variable. The secret processing operation may be protected by being stored within a secure memory, or potentially protected as being part of a further, and separate, cryptographic program which has been installed upon the mobile device. The result value will have a particular form if the dynamic variable has a characteristic matching an expected characteristic, e.g. the dynamic variable is a counter which is only expected to increase and the processing operation checks that the counter has increased in a manner consistent with the personalisation program and the cryptographic program continuing to be installed upon the same instance of a device upon which they were originally installed, i.e. they have not been copied to a different device.

In the example discussed above, the personalisation program generator 20 generates the personalisation program 22 in a source code form. It is also possible that the personalisation program 22 may be generated in a different form, such as a compiled form. Nevertheless, the personalisation program 22 may be considered to be a source program which is then subject to obfuscation by step 24 to generate a form of the personalisation program to be installed as an installed personalisation program 26 within a mobile device. The obfuscation applied may be varied between instances of the personalisation program in a manner to resist reverse engineering. The diversification function (algorithm) applied by the diversification program to the diversification input values, and/or the selection of the diversification input values to be used, may be frequently changed so as to make breaking the security by an attacker more difficult. Users all download a diversification program, but that diversification may be readily and regularly changed. More generally, the personalisation program may be considered to be provided with an isolated execution environment in order to protect the security of the personalisation program. This isolated execution environment may be provided by means of obfuscation, or by another means, such as a secure execution domain supported by the mobile device (e.g. a trusted execution environment). The personalisation input values used by an instance of the personalisation program may be a proper subset selected from a superset of all possible personalisation input values. This makes it difficult for an attacker to identify the superset without having to analyse a large number of devices.

The diversification value returned by the mobile device to the server in order to facilitate communication between the server and the device may be transmitted in a variety of forms. One form may be as an encrypted personalisation input used by the mobile device such that the diversification value may be regenerated at the server since the server has access to the same personalisation program which is being used by the mobile device and can thus generate the diversification value by applying the same personalisation input to that personalisation program. Another example form would be to communication the diversification value as an encrypted diversification value using, for example, public/private key encryption.

Figure 3:
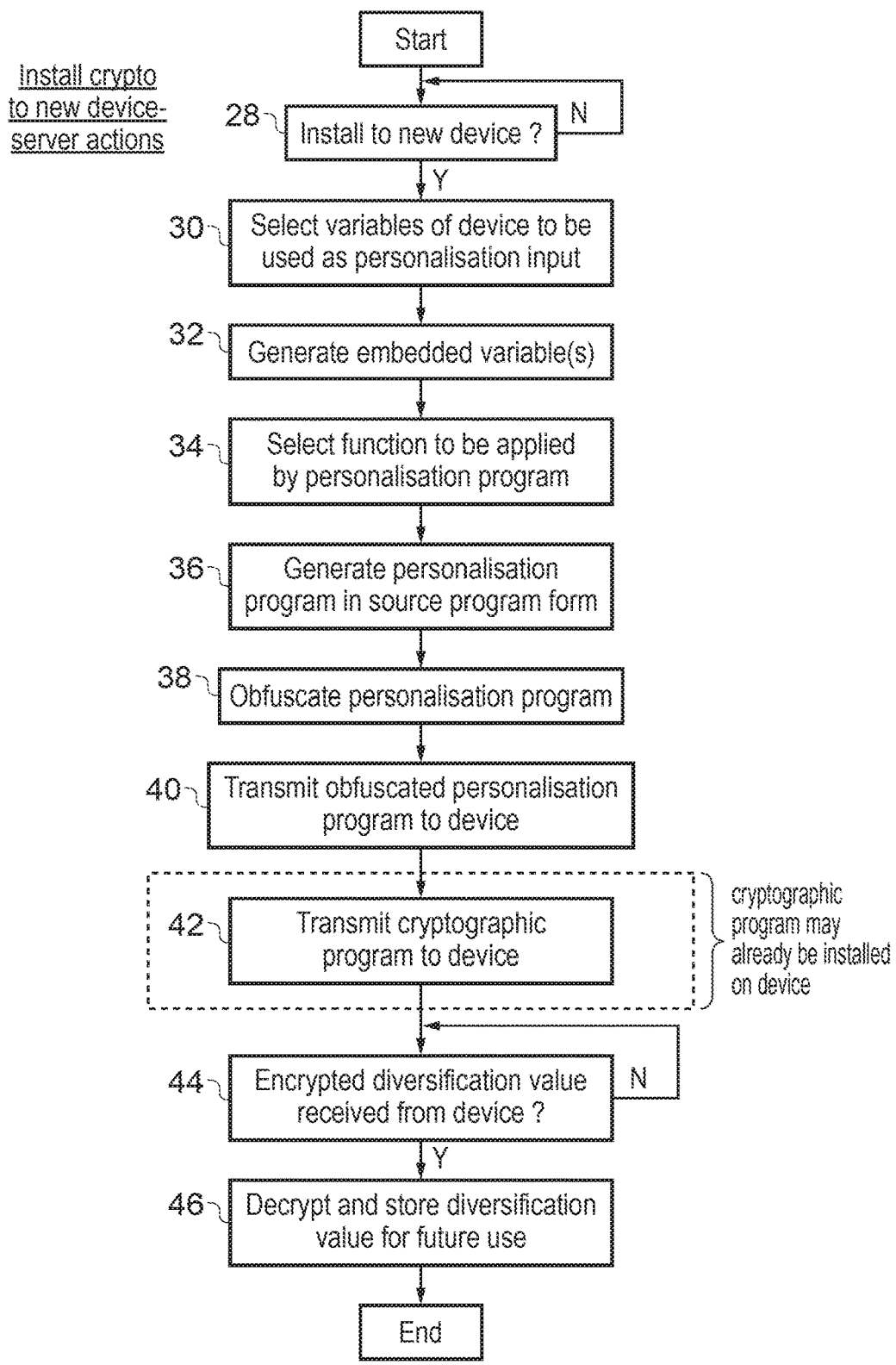
FIG. 3 is a flow diagram schematically illustrating the actions at a server associated with installation of cryptographic functionality to a new device.

FIG. 3 is a flow diagram schematically illustrating actions performed at a server when it is desired to install a cryptographic capability at a new device. At step 28 processing waits until a requirement to install the cryptographic capability to a new device is detected. Step 30 serves to select a proper subset of possible variables characterising the execution environment of the device which is the target of the installation and that are to be used as part of the personalisation input to a personalisation program. These variables may, for example, take the form of hardware properties, static software configuration properties, results of predetermined processing operations upon dynamic variables or other characteristics useful in identifying the particular execution environment provided by an individual device. Step 32 generates one or more embedded variables to be used to control the operation of the personalisation program to be generated. Step 34 selects the particular function to be applied by the personalisation program to generate a diversification value from the personalisation input supplied to the personalisation program. Step 36 generates the personalisation program using the selected variables from step 30, the embedded variables from step 32 and the selected function from step 34. The personalisation program is generated in a source program form. Step 38 performs obfuscation of the personalisation program generated at step 36, such as, for example, by code flattening, code reordering, variable fragmentation and the like. Step 40 transmits the obfuscated personalisation program to the target device.

If the cryptographic program to be used in conjunction with the personalisation program has not already been transmitted to, or installed at, the target device, then step 42 serves to transmit the cryptographic program to the target device.

Processing waits at step 44 until an encrypted diversification value is received from the target device. When an encrypted diversification is received from the target device, step 46 serves to decrypt and store this diversification value for future use by the server in association with its own copy of the cryptographic program which has been installed at the device in order to provide a secure communication channel for exchanging protected data with the target device.

Figure 4:
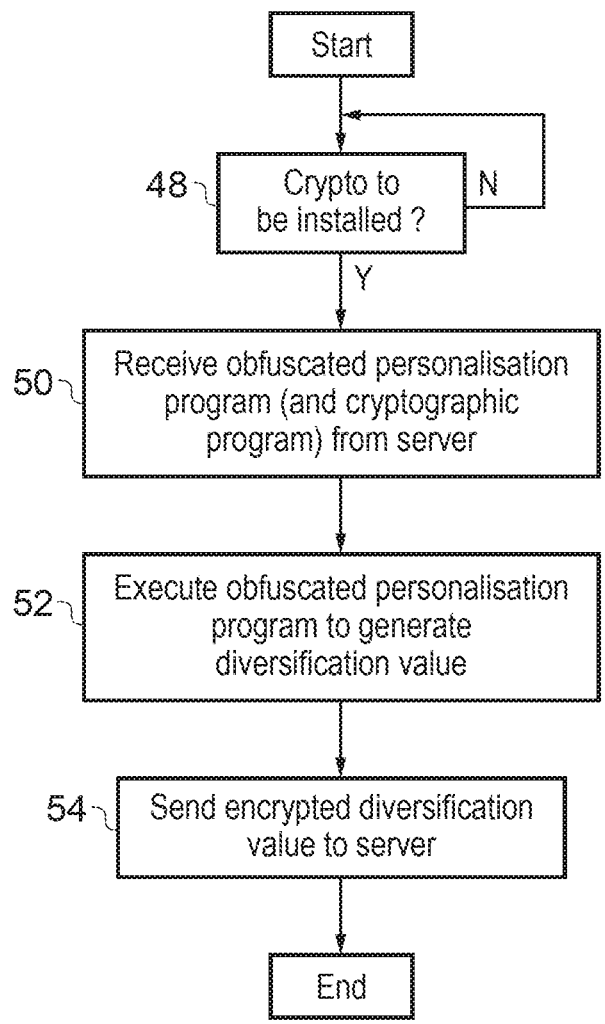
FIG. 4 is a flow diagram schematically illustrating actions at a device associated with installation of cryptographic functionality to that new device.

FIG. 4 is a flow diagram schematically illustrating actions at a target device when cryptographic functionality is to be installed at that target device. Processing waits at step 48 until it is determined that cryptographic functionality is to be installed. Step 50 serves to receive the obfuscated personalisation program 26 from the server. Optionally, the cryptographic program 18 may also be received at this time. It is also possible that the cryptographic program could have previously, and separately, been installed with the processing illustrated in FIG. 4 being associated with activation of that cryptographic program rather than its initial installation.

At step 52, the obfuscated personalisation program is executed by the device in order to read the personalisation input to the obfuscated personalisation program and to generate a diversification value unique (or quasi-unique) to that device. At step 54, the diversification value generated at step 52 is encrypted (e.g. using the public key of the server) and sent back to the server as previously mentioned. The diversification value generated at step 52 may also be supplied to the cryptographic program 18 installed at the device and used to control the cryptographic operations performed by the cryptographic program 18 in dependence upon that diversification value.

Figure 5:
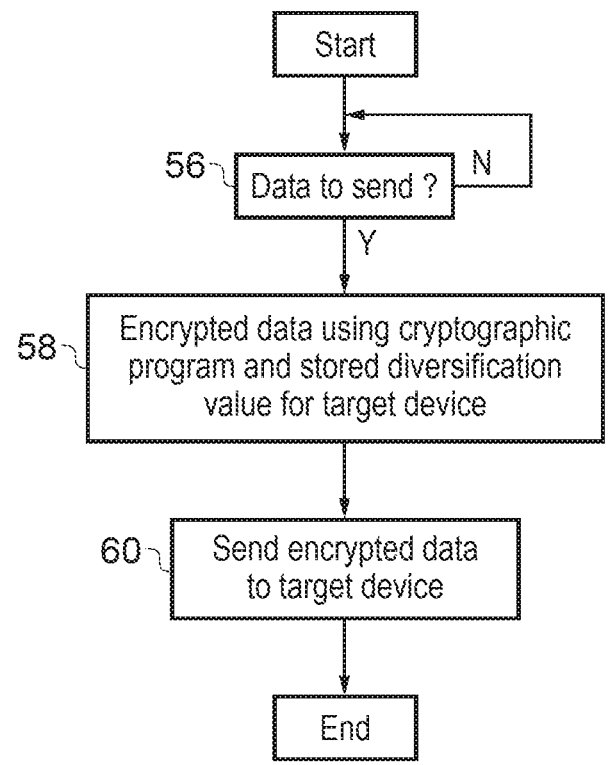
FIG. 5 is a flow diagram schematically illustrating a server sending protected data to a device.

FIG. 5 schematically illustrates operations at a server wishing to send protected data to a device. At step 56, processing waits until there is data to send. When there is data to send, step 58 serves to encrypt that data using the same cryptographic program 16 as is installed at the device concerned as well as the stored diversification value which was returned from the target device and which represents the execution environment of that individual target device. At step 60, the encrypted data generated at step 58 is sent to the target device. The correct target device will use the same cryptographic program and the same diversification value so that it is able to decrypt the encrypted data sent to it. A different (unauthorised) device receiving that encrypted data may have possession of the same cryptographic program 16 and personalisation program, but will not generate the same diversification value from its own instance of the personalisation program and accordingly will not be able to properly decrypt the encrypted data that it receives.

Figure 6:
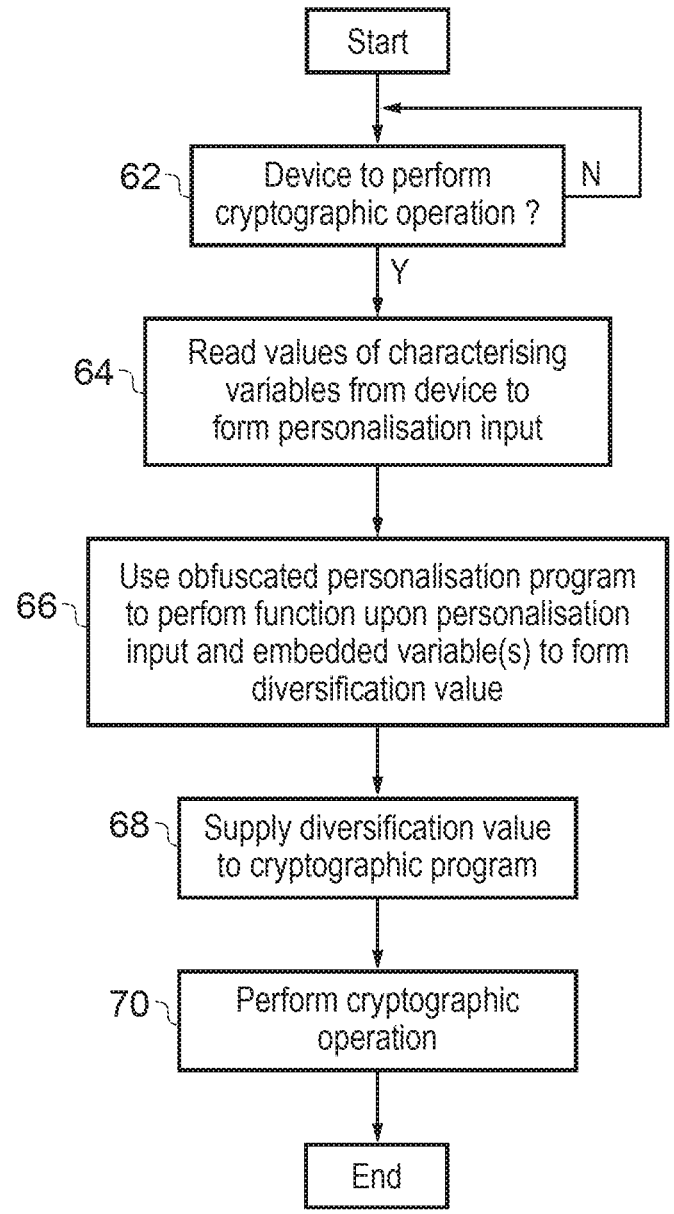
FIG. 6 is a flow diagram schematically illustrating performance of a cryptographic operation at a device.

FIG. 6 schematically illustrates processing operations performed upon a device when it is desired to perform a cryptographic operation. Processing waits at step 62 until it is determined that the device is to perform a cryptographic operation. Processing proceeds to step 64 where the personalisation program 26 installed on the device concerned reads values of characterising variables of the device to form the personalisation input to the personalisation program 26 of the device. At step 66, the obfuscated personalisation program 26 at the device uses the read values of the characterising variables (i.e. the personalisation input) to perform a preselected function upon that personalisation input (and any embedded variables within the personalisation program) to form a diversification value. At step 68 the diversification value generated at step 66 is supplied to the instance of the cryptographic program 18 installed at the device. Step 70 performs the desired cryptographic operation in dependence upon the received diversification value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of operating a data processing apparatus comprising:

receiving a personalisation program at said data processing apparatus;

executing said personalisation program to read personalisation input including one or more of an installed memory size, an IMEI value, a MAC address, a processor type, or a cache memory size of said data processing apparatus, wherein the personalisation input varies between different data processing apparatus when said personalisation program is executed in different data processing apparatus, and to generate a diversification value based on execution of said personalisation program using personalisation input that is tied to said data processing apparatus, supplying said diversification value as a diversification input to a cryptographic program separate from said personalisation program; and executing said cryptographic program to perform a cryptographic operation in dependence upon said diversification value.

2. The method as claimed in claim 1, wherein the personalisation input includes static software configuration variables of said data processing apparatus.

3. The method as claimed in claim 1, wherein the personalisation input includes at least one result value determined by applying a processing operation to a dynamic variable of said data processing apparatus, data specifying said processing operation to be applied being stored within secure storage of said data processing apparatus.

4. The method as claimed in claim 1, wherein said personalisation program is executed in an isolated execution environment by said data processing apparatus.

5. The method as claimed in claim 4, wherein said isolated execution environment is provided by obfuscation of said personalisation program whereby said personalisation program is formed by subjecting a source program to a code obfuscation process.

6. The method as claimed in claim 1, comprising:
transmitting data specifying said diversification value to a server;
receiving from said server encrypted protected data encrypted in dependence upon said diversification value; and
decrypting said encrypted protected data using said cryptographic program in dependence upon said diversification input to recover said protected data.

7. The method as claimed in claim 6, wherein said data specifying said diversification value comprises one of:
an encrypted form of said personalisation input; and
an encrypted form of said diversification value.

8. The method as claimed in claim 1, wherein said personalisation program includes at least one embedded variable and said diversification value is a function of said at least one embedded variable.

9. The method as claimed in claim 1, wherein said data processing apparatus is a wireless mobile device and comprising wirelessly downloading said personalisation program to said wireless mobile device.

10. A data processing apparatus comprising program controlled processing circuitry configured to perform the steps of:
receiving a personalisation program at said data processing apparatus;
executing said personalisation program to read personalisation input including one or more of an installed memory size, an IMEI value, a MAC address, a processor type, or a cache memory size of said data processing apparatus, wherein the personalisation input varies between different data processing apparatus when said personalisation program is executed in different data processing apparatus, and to generate a diversification value based on execution of said personalisation program using personalisation input that is tied to said data processing apparatus,
supplying said diversification value as a diversification input to a cryptographic program separate from said personalisation program; and
executing said cryptographic program to perform a cryptographic operation in dependence upon said diversification value.

11. A method of configuring a data processing apparatus comprising:
selecting a proper subset from among a set of variables of said data processing apparatus, values of said proper subset serving as values of a plurality of variables characterising said data processing apparatus;
generating a personalisation program to control said data processing apparatus to read personalisation input including one or more of an installed memory size, an IMEI value, a MAC address, a processor type, or a cache memory size of said data processing apparatus, wherein the personalisation input varies between different data processing apparatus when the personalisation program is executed in the different data processing apparatus, and to generate a diversification value based on the execution of said personalisation program using personalisation input that is tied to said data processing apparatus,
and
transmitting said personalisation program to said data processing apparatus.

12. The method as claimed in claim 11, comprising
receiving data specifying said diversification value from said data processing apparatus;
encrypting protected data in dependence upon said diversification value to form encrypted protected data; and
transmitting said encrypted protected data to said data processing apparatus.

13. The method as claimed in claim 11, comprising:
selecting a selected function from among a plurality of functions to serve as said function for generating said diversification value from said personalisation input; and wherein
said generating generates said personalisation program to use said selected function to generate said diversification value.

14. The method as claimed in claim 11, comprising transmitting said cryptographic program to said data processing apparatus for execution by said data processing apparatus, said cryptographic program configured to perform cryptographic operations as a function of said diversification value.

15. The method as claimed in claim 12, comprising transmitting said cryptographic program to said data processing apparatus for execution by said data processing apparatus, said cryptographic program configured to perform cryptographic operations as a function of said diversification value, wherein said cryptographic operations include decrypting said encrypted protected data as a function of said diversification value.

16. The method as claimed in claim 11, wherein said personalisation input includes static software configuration variables of said data processing apparatus.

17. The method as claimed in claim 11, wherein said personalisation input includes at least one result value determined by applying a processing operation to a dynamic variable of said data processing apparatus, data specifying said processing operation to be applied being stored within secure storage of said data processing apparatus.

18. The method as claimed in claim 11, wherein said personalisation program is generated by subjecting a source program to a code obfuscation process.

19. The method as claimed in claim 11, wherein said data specifying said diversification value comprises one of:
an encrypted form of said personalisation input; and
an encrypted form of said diversification value.

20. The method as claimed in claim 11, wherein said personalisation program includes at least one embedded variable and said diversification value is a function of said at least one embedded variable.

21. The method as claimed in claim 11, wherein said data processing apparatus is a wireless mobile device and comprising wirelessly transmitting said personalisation program to said wireless mobile device.

22. A data processing apparatus comprising program controlled processing circuitry configured to perform the steps of:
   selecting a proper subset from among a set of variables of said data processing apparatus, values of said proper subset serving as values of a plurality of variables characterising said data processing apparatus,
   generating a personalisation program to control said data processing apparatus to read personalisation input including one or more of an installed memory size, an IMEI value, a MAC address, a processor type, or a cache memory size of said data processing apparatus, wherein the personalisation input varies between different data processing apparatus when said personalisation program is executed in different data processing apparatus, and to generate a diversification value for a cryptographic program separate from said personalisation program based on execution of said personalisation program using personalisation input that is tied to said data processing apparatus; and
   transmitting said personalisation program to said data processing apparatus.

23. A method of operating a server and a data processing apparatus comprising:
   at said server:
      selecting a proper subset from among a set of variables of said data processing apparatus, values of said proper subset serving as values of a plurality of variables characterising said data processing apparatus;
      generating a personalisation program to control said data processing apparatus to read personalisation input including one or more of an installed memory size, an IMEI value, a MAC address, a processor type, or a cache memory size of said data processing apparatus, wherein the personalisation input varies between different data processing apparatus when said personalisation program is executed in different data processing apparatus, and to generate a diversification value for a cryptographic program separate from said personalisation program based on execution of said personalisation program using personalisation input that is tied to said data processing apparatus; and
      transmitting said personalisation program to said data processing apparatus; and
   at said data processing apparatus:
      receiving said personalisation program at said data processing apparatus;
      executing said personalisation program to read as said personalisation input said values of said plurality of variables characterising said data processing apparatus and to generate said diversification value as said function of said personalisation input,
      and
      supplying said diversification value as said diversification input to said cryptographic program; and
      executing said cryptographic program to perform a cryptographic operation in dependence upon said diversification value.

* * * * *